United States Patent [19]

Propst et al.

[11] 4,161,803
[45] Jul. 24, 1979

[54] CASTER

[76] Inventors: Robert L. Propst, 2347 Londonderry; Paul L. Propst, 2490 Laurelwood, both of Ann Arbor, Mich. 48104

[21] Appl. No.: 859,319

[22] Filed: Dec. 12, 1977

[51] Int. Cl.² ............................................. B60B 33/00
[52] U.S. Cl. .................................. 16/18 A; 16/47
[58] Field of Search .............. 16/18 A, 18 R, 47, 45

[56] References Cited

U.S. PATENT DOCUMENTS

| 767,212 | 8/1904 | Dornauf | 16/18 A |
|---|---|---|---|
| 2,878,070 | 3/1959 | Novima | 16/45 X |

FOREIGN PATENT DOCUMENTS

| 1345564 | 4/1963 | France | 16/47 |
|---|---|---|---|
| 2007012 | 2/1970 | France | 16/45 |
| 477999 | 10/1969 | Switzerland | 16/18 A |
| 2507 | of 1876 | United Kingdom | 16/18 A |

*Primary Examiner*—Dorsey Newton
*Attorney, Agent, or Firm*—Olsen and Stephenson

[57] ABSTRACT

A caster including a pair of diametrically opposed rollers having axes of rotation which are angled with respect to the supporting surface on which the caster travels. During movement of the caster, the rollers exert opposing transversely-directed forces on the caster thereby enabling the caster to be moved in its directed path without the creation of forces on the caster by the rollers which would tend to deflect the caster from its path.

3 Claims, 12 Drawing Figures

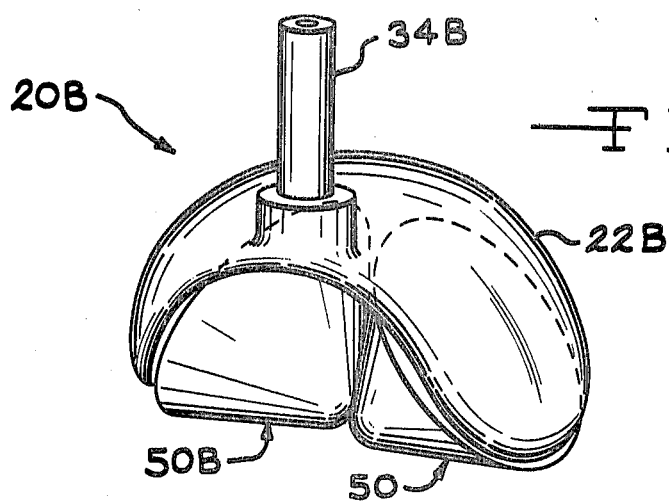
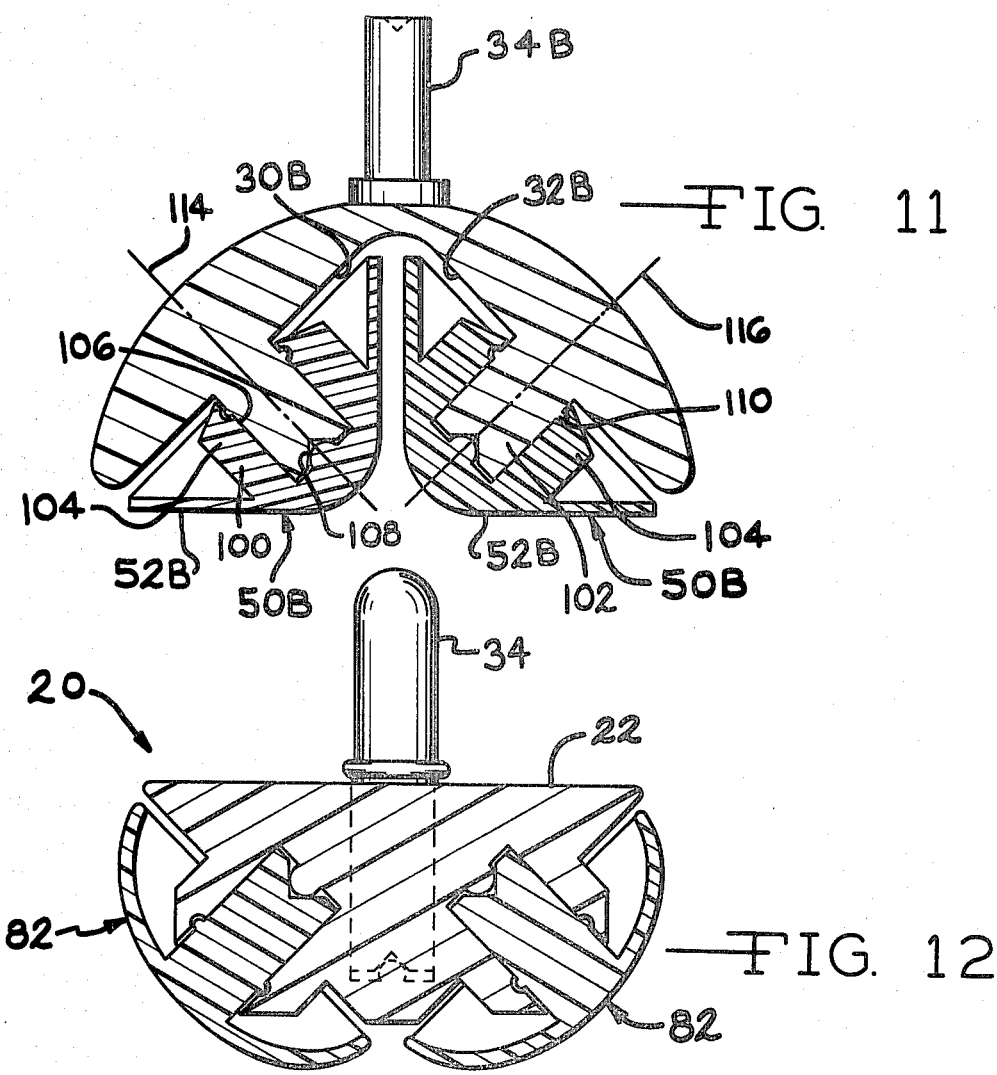

CASTER

BACKGROUND OF THE INVENTION

The present invention relates generally to a caster for furniture or the like, and more particularly, to a caster adapted for use on a carpeted floor.

The use of carpeting as a floor covering has become a popular alternative to tiled or hardwood floors. This is especially true in office settings, for carpeting has excellent sound absorbing characteristics, is aesthetically pleasing, durable, and its use can reduce construction costs since inexpensive materials can be used for the supporting floor.

Caster design in the past has failed to provide a low profile compact caster capable of operating efficiently on a carpet. Some prior art casters are equipped with large cylindrical rollers which provide a sufficiently large surface area to prevent the caster from sinking into the fibers of the carpet. These large rollers, however, increase the size of the caster and hinder its pivoting on the carpeting making the caster unresponsive to any change in the direction of movement of the article of furniture that is supported by the caster. Another type of caster such as is disclosed in U.S. Pat. No. 2,096,239 has a single roller having an axis of rotation that is angled relative to the floor. Consequently, the caster tends to track in a circular path resulting in extra effort being exerted by the user in moving the furniture along a straight path to a desired location.

It is an object, therefore, of the present invention to provide a low profile compact caster having a relatively large supporting surface adapted for use on carpeting and being movable in a directed path without deviation.

SUMMARY OF THE INVENTION

In accordance with the present invention, an improved caster is provided comprising a body having front, rear, and side portions and a pair of diametrically opposed rollers which are mounted on the opposite sides of the body of the caster. The axis of rotation of each roller is oriented at a preselected angle with respect to the supporting surface on which the caster travels so that a maximum portion of the roller surface engages the carpet. In one form of the invention, the axes of rotation of the rollers extend inwardly and upwardly toward each other. Consequently, as the caster is moved in a straight path, each roller tends to roll in circular paths away from each other. This roller movement creates offsetting and opposite transversely-directed forces that are applied to the caster body. These forces cause the rollers to roll and slide over the carpet enabling the caster body to be moved in its directed path without deviation. The angular mounting of the rollers enables the use of rollers having a peripheral shape that provides a large surface area for contacting the carpeting. Consequently, the rollers do not sink into the fibers of the carpet and the caster exhibits a low-profile construction.

In another form of the invention, the axes of rotation of the rollers extend upwardly and outwardly from the supporting surface so that the rollers tend to roll through circular paths toward each other. Thus, offsetting inwardly directed forces are applied to the caster so that the caster can be moved along its directed path without deviation. Again, the rollers slip and roll over the carpeting as the caster is moved in its directed path.

Further objects, features, and advantages of the present invention will become apparent from a consideration of the following description when taken in connection with the appended claims and the accompanying drawings in which:

Figure 4:
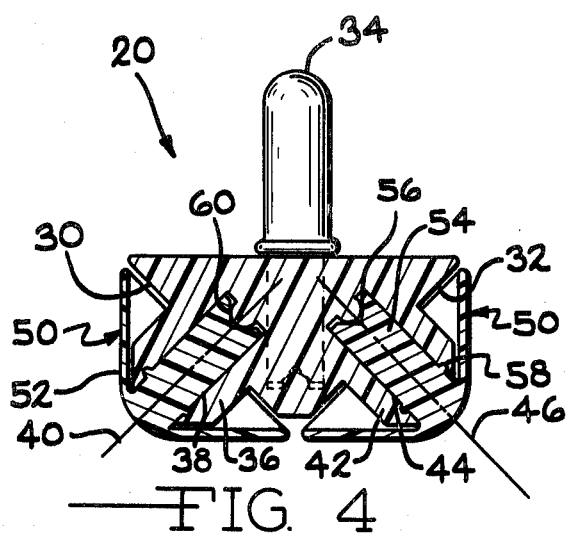
FIG. 4 is a front sectional view of the caster of the present invention taken substantially from line 4—4 in FIG. 3.
Figure 5:
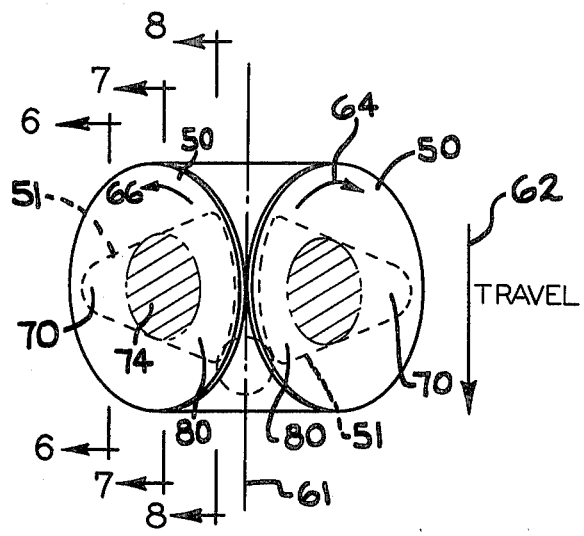
FIG. 5 is a bottom view of the caster shown in FIG. 2 illustrating the surface areas of the rollers that engage the carpeting upon which the caster travels.
Figure 6:
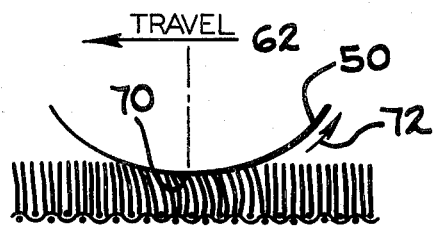
Figure 7:
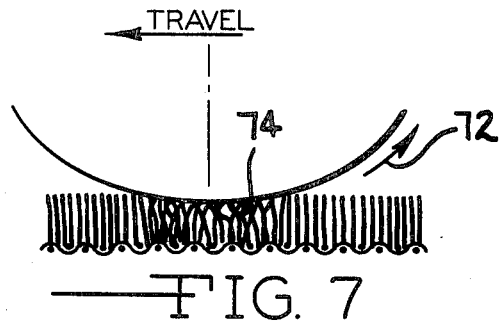
Figure 8:
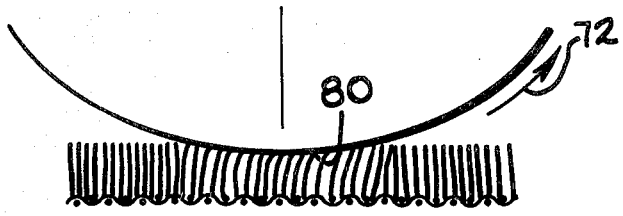
Figure 9:
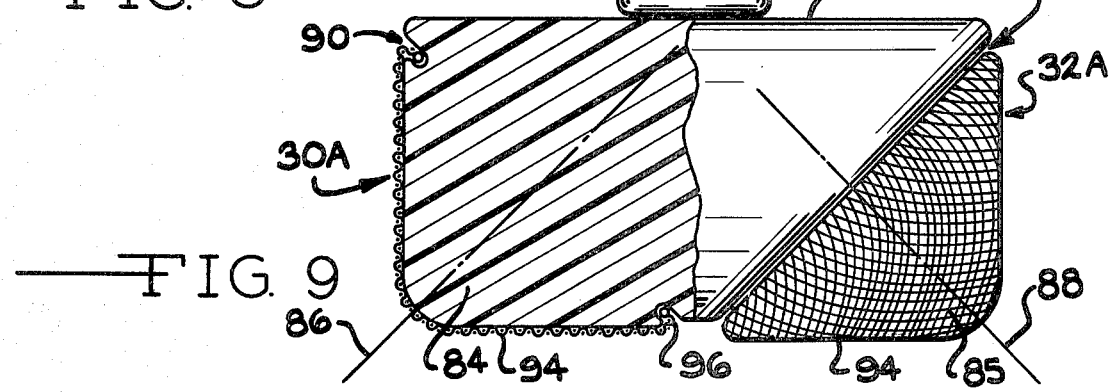

FIGS. 6, 7, and 8 illustrate the reaction of the fibers of the carpeting to movement of the casters over the carpeting as viewed from the lines 6—6, 7—7, and 8—8, respectively, in FIG. 5;

FIG. 9 is a front elevational view, shown partly in section, illustrating a modified form of the caster of this invention;

FIG. 10 is a perspective view of another modified form of the invention;

FIG. 11 is a vertical sectional view of the caster shown in FIG. 10 corresponding to the sectional view shown in FIG. 4; and FIG. 12 is a vertical sectional view of a caster similar to the caster shown in FIG. 4, but having modified rollers.

Figure 1:
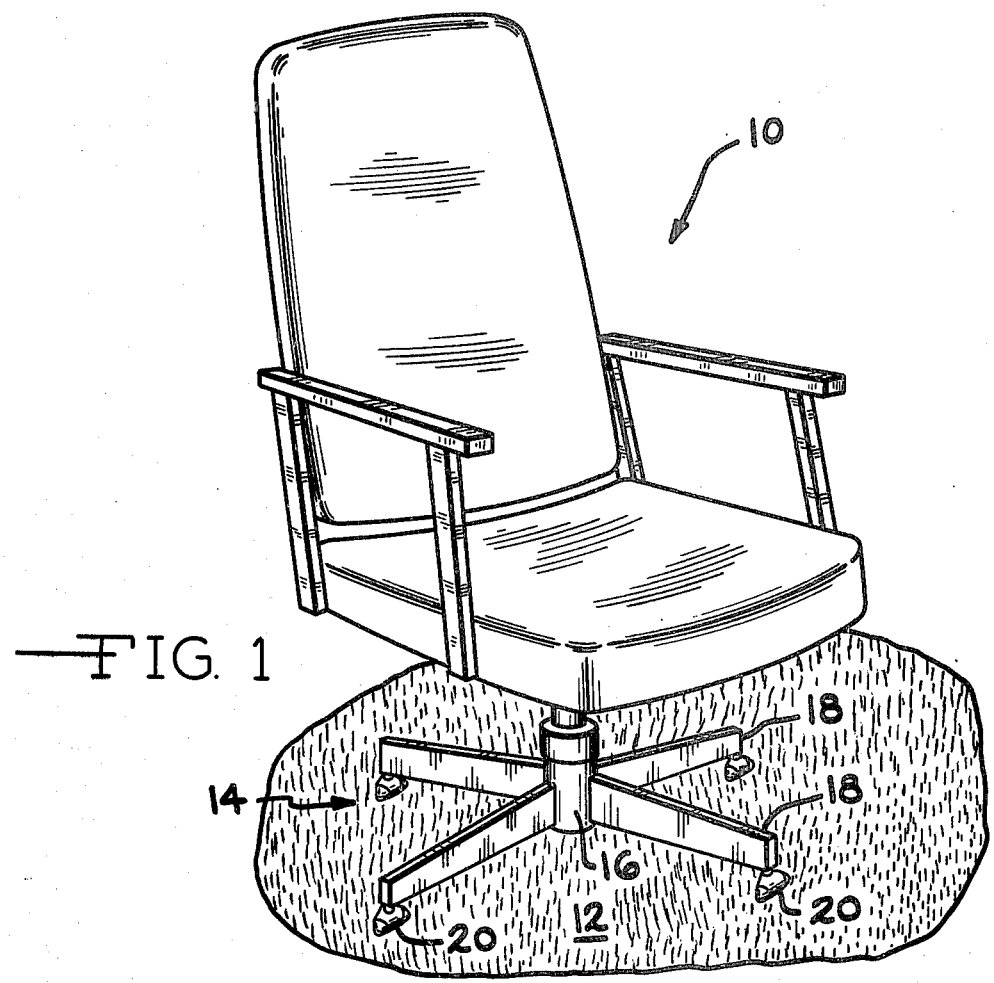
FIG. 1 is a perspective view of an office chair supported by the casters of the present invention.

Referring to the drawing, an office chair, indicated generally at 10 in FIG. 1, is shown on a carpeted floor 12. The chair 10 includes a base 14 having a support column 16 from which legs 18 extend in radial directions. A caster 20 is affixed to each leg 18 for facilitating movement of the chair 10 over the carpeted surface 12.

As seen in FIGS. 2-5, the caster 20 comprises a main body 22 having a front portion 24, a rear portion 26, a top portion 28, and side portions 30 and 32. An upright spindle 34 is mounted on the body 22 at its rear portion 26 midway between the sides 30 and 32. The spindle 34 is inserted into a mounting (not shown) on one of the legs 18 for pivotting about a vertical axis defined by the spindle 34. The side portions 30 and 32 are inclined so as to face outwardly and downwardly from the body 22 forming a V-shaped configuration as viewed in FIG. 4.

A cylindrically-configured pivot portion 36 having an internal bore 38 is integrally formed with the body 22 and extends from the side 30 in a direction that extends generally perpendicularly from the surface of the side portion 30. The bore 38 and the pivot portion 36 have a common axis 40. Similarly, a pivot portion 42 having a bore 44 is integrally formed with the body 22 to extend substantially perpendicularly from the side 32. The pivot portion 42 and the bore 44 have a common axis 46. The axes 40 and 46 thus extend upwardly toward each other.

Figures 2, 3:
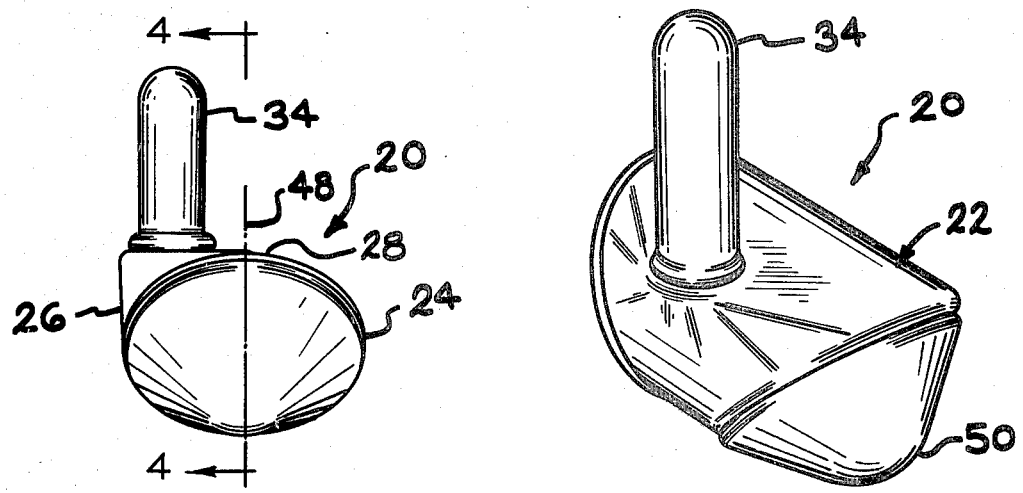
FIG. 2 is a perspective view of a caster of the present invention.
FIG. 3 is a side elevational view of the caster shown in FIG. 2.

As seen in FIG. 3, the axes 40 and 46 are located in a common upright plane 48 that extends transversely through the body 22 substantially midway between the front portion 24 and the rear portion 26. Consequently, the upright spindle 34 is located at a position rearwardly of the plane 48 on the body 22. In this manner, the spindle 34 does not interfere with the bores 38 and 44 enabling the compact construction of the caster 20.

A pair of identical rollers 50 are mounted to the body 22, one roller 50 being mounted on the pivot portion 36 and the other roller 50 being mounted on the pivot portion 42. Each roller 50 has a conically-shaped outer or peripheral surface 52 and a cylindrical axle 54 extending away from its vertex. The free end of the axle 54 has a cavity 56 and an annular retainer 58 is integrally formed around the circumference of the axle 54. The rollers 50 are mounted on the body 22 by positioning the axles 54 in the bores 38 and 44. Bearing members 60, formed at the closed end of the bores 38 and 44, are positioned in the cavities 56 to serve as thrust bearings. The annular retainers 58 fit into circumferential grooves formed in the walls of the bores 38 and 42 to frictionally maintain the rollers 50 in place when the caster is raised above the floor. Each roller 50, therefore, is rotatable about its respective axis 40 or 46. Mounting the conically-shaped rollers 50 to the body 22 so that the angles of the axes of rotation are inclined relative to the carpeted surface 12 provides large roller surfaces or footprints, indicated by the broken lines 51 in FIG. 5, which ride on the carpeting. Use of the diametrically opposed rollers 50 on the caster 20 enables a low-profile construction for the caster 20 and reduces the effort to pivot the caster 20 on the carpeting while the caster is supporting a load.

When the caster 20 is moved in the direction of travel indicated by the arrow 62 in FIG. 5, the rollers 50 rotate in opposite directions indicated by the arrows 64 and 66. A vertical plane, shown at 61 in FIG. 5, passing through th spindle 34 is centered with respect to the rollers 50. Accordingly, as the caster 20 travels over the carpeting 12, the rollers 50 tend to roll in circular paths that are spaced equal distances from the spindle 34 and impart opposing equal transversely directed forces on the caster 20. As a result, the caster 20 moves in its directed path without deviation and the rollers 50 both slide and roll across the carpeting.

With reference to FIGS. 5–8, the reaction of the fibers of the carpeting 12 to the various surface portions of the footprint 51 as the caster 20 is moved in the direction fo the arrow 62 is shown. The surface portion 70 near the vertex of the roller bends the fibers of the carpeting 12 in the direction of travel of the caster 20 as seen in FIG. 6. This is because the speed of the caster 20 more than offsets the surface speed of the roller 50 which is rolling in a direction opposite to the direction of travel of the caster 20, indicated by the line 72. The hatched portion 74 of the surface 51 which is intermediate the vertex and the end of the roller 50 has a surface speed that is generally equal to the speed of travel, but in the opposite direction. Thus, the fibers bend in random directions, as can be seen in FIG. 7. The portion 80 of the roller 50 bends the fibers in directions opposite to the caster 20's direction of travel, as seen in FIG. 8. This reaction occurs because the surface speed of the roller 50 is greater than the speed of travel of the caster 20. It can thus be seen that the portions 74 and 80 tend to both roll and slide over the carpeting 12 while the portion 74 rolls over the carpeting 12.

As shown in FIG. 12, rollers 82 having a generally elliptically-shaped peripheral surface may be substituted for the rollers 50. A smaller carpet surface engaging surface or footprint results, but a greater clearance is provided between the rollers 82 than the clearance that exists between the rollers 50 which is advantageous for carpets of long fiber construction.

A modified form of the caster illustrated at 20A in FIG. 9, consists of a body 22A having a pair of integrally formed conical sections or extension members 84 and 85 formed on opposite sides 30A and 32A of the body 22A. The conical sections 84 and 85 have inclined axes 86 and 88, respectively. A groove 90 is formed in the body 22A and is located in a plane that is substantially perpendicular to the axis 86. Similarly, a groove 92 is formed in the body 22A in a plane that is substantially perpendicular to the axis 88. A flexible fabric boot 94 having an elastic border 96 is fitted over each section 84 and 85 with the elastic border 96 positioned in the respective grooves 90 and 92. The fabric boot 94 thus slips over the conical section on which it is mounted. The fiber reactions of the carpeting 12 to the boots 94 and transversely directed forces on the caster 20A are identical to the reactions described with respect to the caster 20.

In another modified form of the invention, illustrated in FIGS. 10 and 11, a caster 20B is provided having a body 22B and an upright spindle 34B. The body 22B has inwardly-facing sides 30B and 32B inclined so as to form a generally-inverted V-configuration. An axle 100 is integrally formed with the body 22B and extends away from the side 30B in a substantially perpendicular direction. Likewise, a similar axle 102 is provided on the opposite side 32B to extend away from the side 32B in a substantially perpendicular direction.

A pair of rollers 50B are mounted on the caster 20B; one roller 50B is rotatably mounted on the axle 100 and the other roller 50B is mounted on the axle 102. Each roller 50B has a conically-shaped peripheral surface 52B which rides on the carpeting 12 and a pivot portion 104 having an axle-receiving bore 106 for receiving one of the axles 100 or 102. A thrust-bearing surface 108 is integrally formed on each roller 50B in the bore 106 and is disposed in a cavity 110 in the terminal end of the axle 100 or 102 to serve as a thrust bearing. Retainer means in the form of an annular ridge 110 is formed on each axle 100 and 102 and is disposed in a mating circumferential groove 112 formed in the axle-receiving bore 106. The axle 100 has an axis 114 and the axle 102 has an axis 116. As in the above-described embodiments, the axes 114 and 116 are angled relative to the carpet 12 so that the maximum surface area of the roller 50B will engage the floor providing a footprint similar to the footprint 51 shown in FIG. 5. The axes 114 and 116 extend upwardly and outwardly from each other and are located in a common plane.

When the caster 20B is moved over the carpet 12, the fiber reactions relative to the various surface portions are the same as the fiber reactions described in reference to FIGS. 6–8. The difference in this embodiment is that the rollers 50B are positioned so that the vertexes of the conical configurations are located adjacent to each other whereas the vertexes of the caster 20 extend outwardly from each other.

The rollers 50B roll and slide over the carpet 12 and tend to roll in circular paths toward each other. This tendency of the rollers 50B to move toward each other imparts inwardly and oppositely-directed transverse forces on the caster 20B. The roller 20B can therefore be moved in its directed path without deviation.

From the above description, it can be seen that an improved caster is provided which is adapted for use on carpeting. The diametrically-opposed rollers are angularly mounted to provide the maximum contact area between their surfaces and the carpeting and to impart opposing transverse forces on the caster so that the caster 20 can be moved in its directed path without deviation.

What is claimed:

1. A low profile caster particularly adapted for rolling support on a carpet having carpet fibers, said caster comprising a body having an upright spindle, a pair of extension members formed on said body on opposite sides of said spindle, rollers rotatably mounted on said extension members, each of said rollers comprising a flexible boot fitted over one of said extension members and slidably engaged therewith, each of said boots slidably rotating on one of said extension members about an axis of rotation inclined with respect to said spindle in response to movement of said caster on said carpet, each of said boots having an outer surface engageable with said carpet and diverging away from said axis, bottom portions of said surfaces of said boots being positioned on opposite sides of and equidistant from said spindle so as to be centered therewith.

2. The caster according to claim 1, wherein a groove for each boot is formed in said body for maintaining said boot on its corresponding extension member, said groove located in a plane that is generally perpendicular to the axis of rotation of said boot.

3. The caster according to claim 1, wherein each of said flexible boots terminates in an elastic border positionable into one of said grooves to hold said boot on said body.

* * * * *